United States Patent [19]
Pfeiffer

[11] 3,791,375
[45] Feb. 12, 1974

[54] DEVICE FOR SENSING AND WARNING OF EXCESSIVE AMBULATION FORCE

[76] Inventor: Erich A. Pfeiffer, 8730 Orion Ave., Los Angeles, Calif. 91343

[22] Filed: Sept. 29, 1971

[21] Appl. No.: 184,662

[52] U.S. Cl.............. 128/2 S, 128/2.1 R, 46/175, 116/67 R, 177/209, 73/172
[51] Int. Cl................................................ A61b 5/10
[58] Field of Search.......... 128/2.1 R, 2 S, 2 R, 423; 46/175; 116/65, 67 R; 177/209; 73/172

[56] References Cited
UNITED STATES PATENTS

| | | | |
|---|---|---|---|
| 2,095,268 | 10/1937 | Roberts................................. | 73/172 |
| 2,290,387 | 7/1942 | Schwartz........................... | 128/2.1 R |
| 3,305,036 | 2/1967 | Walters............................... | 177/209 |
| 2,375,059 | 5/1945 | Williams et al. ............... | 128/2.05 A |
| 3,236,230 | 2/1966 | Follett............................ | 128/2.05 A |
| 2,653,475 | 9/1953 | Kraus.................................... | 73/172 |
| 3,533,095 | 10/1970 | Collins................................ | 128/2 R |
| 3,608,541 | 9/1971 | Hall..................................... | 128/2 R |
| 2,413,545 | 12/1946 | Cordi................................ | 116/67 R |
| 2,721,420 | 10/1955 | Chatten .............................. | 46/175 |

Primary Examiner—Aldrich F. Medbery
Attorney, Agent, or Firm—Allan M. Shapiro

[57] ABSTRACT

Warning of excessive ambulation force, for limiting the application of weight on a lower extremity, usually in the recovery from orthopedic surgery of the lower extremity, is accomplished by a fluid-containing load cell which deflects and changes its volume in accordance with the amount of load thereon. A tubular connector connects the load cell fluid with a displacement-measuring device, for example, a bellows. A particular displacement limit, conveniently signaled with an electrical alarm indicates when predetermined load on the cell is reached.

The United States Government is licensed under this patent to make, use or sell this invention for Government purposes.

10 Claims, 7 Drawing Figures

INVENTOR.
ERICH A. PFEIFFER
BY Allan M. Shapiro
ATTORNEY

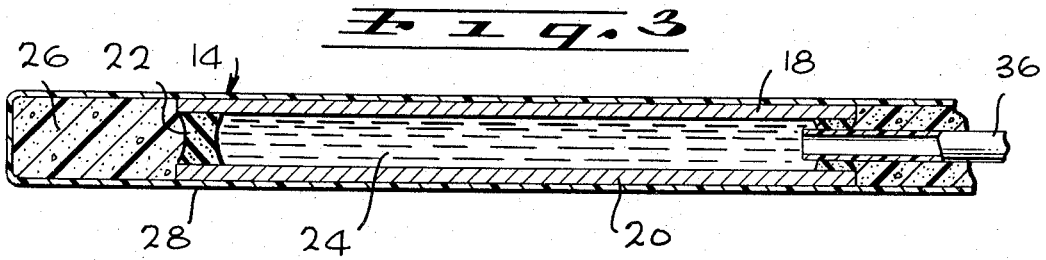
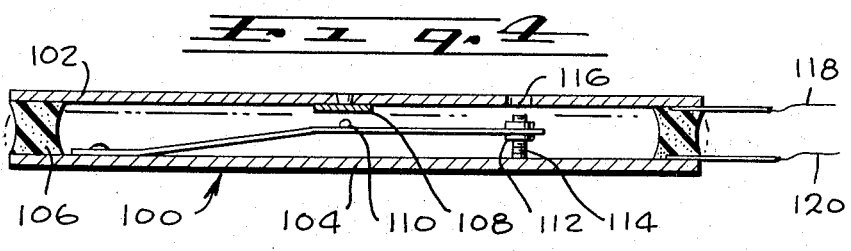
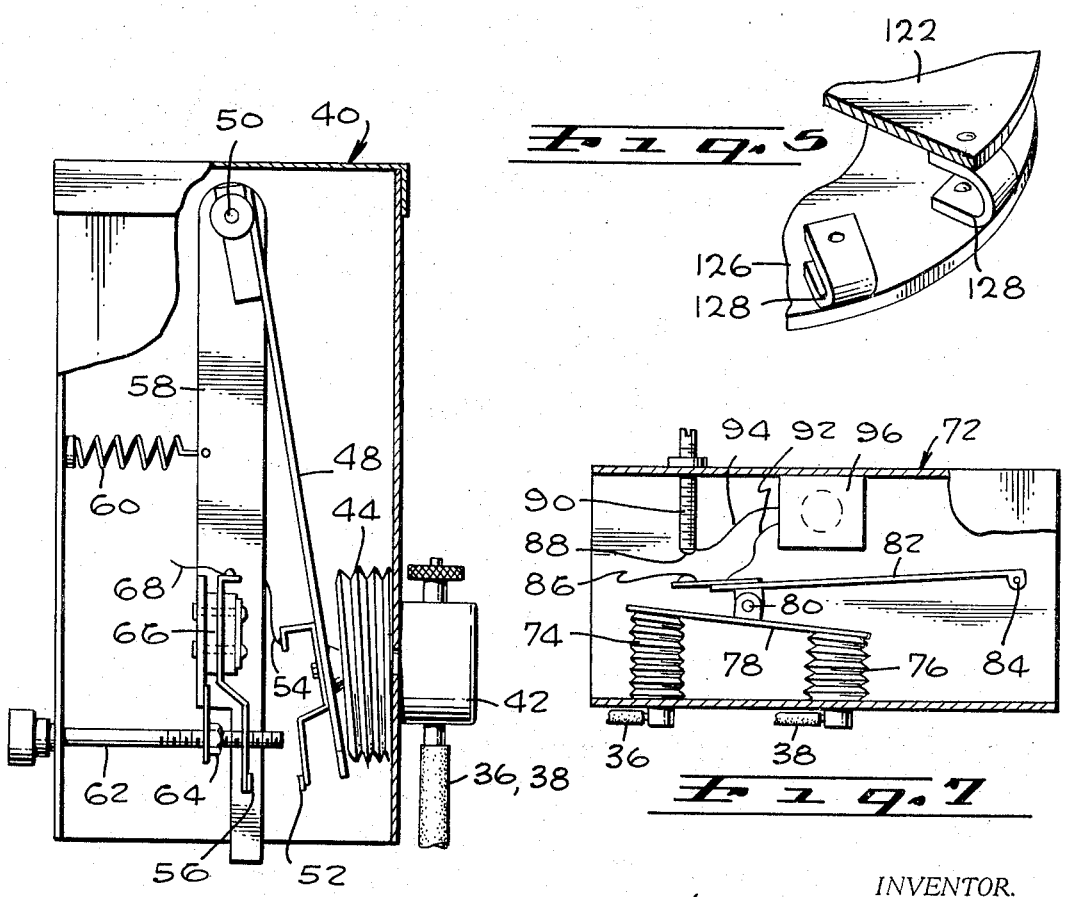

DEVICE FOR SENSING AND WARNING OF EXCESSIVE AMBULATION FORCE

BACKGROUND OF THE INVENTION

1. Field of the Invention

This invention is directed to an orthopedic load-sensing device for warning of excessive ambulation force.

2. Description of the Prior Art

In normal human biped locomotion, the maximum load or force on one leg equals at least the body weight. In some medical circumstances, the load on one leg must be limited. In such cases, crutches or walker devices have been used to relieve part of the load from the afflicted extremity. The need for limiting the application of weight on a lower extremity commonly occurs while recovering from a fracture of the extremity. In other cases where it is even more important to limit the application of weight on one extremity, but occurs less often, are those cases of orthopedic surgery. During recovery from an osteotomy of the hip, or from cup arthroplasties, load limiting is essential.

Prior efforts at limiting these loads have involved proprioceptive techniques, with the load limit established by the physician, depending upon the patient's current load-carrying ability. Thus, the physician prescribed optimum load during exercise for maximized therapeutic benefit. Once this figure was established, the patient repeatedly applied that much load to the lower extremity in question, measuring it on a conventional weighing scale, and developing his proprioceptive awareness for that particular loading. Repeated accuracy in subsequent exercising is difficult to achieve, for the patient wants to be sure not to overload the extremity, and thus is often well below the desired optimum exercise load. On the other hand, under some of these exercise circumstances, overloading can cause orthopedic damage.

Several prior patents are directed to devices for measuring the load on a foot, while walking or the like. These prior devices comprise one or more pressure chambers under the foot, each separated from the other, and each being connected to a pressure gage in a pressurized closed system. Pressure is thus the criterion which is sensed and indicated by the gage. Fluid displacement is unimportant. Such devices are impractical for a number of reasons including the problems of leaks, of instantaneously reading a varying pressure, of pressure variations due to non-compensated ambient conditions and of maintaining substantially incompressible fluid in the system.

SUMMARY OF THE INVENTION

In order to aid in the understanding of this invention, it can be stated in essentially summary form that it is directed to a device for sensing and warning of excessive ambulation force. The device comprises a load cell which has upper and lower substantially inflexible plates joined around their periphery by resilient means which deflects in accordance with the load applied to the plates. Deflection detecting means indicates when a predetermined load is obtained. In the preferred embodiment, the plates are sealed with respect to each other around their periphery, and the volume therebetween is connected to a displacement-measuring device. The displacement-measuring device is preferably a remote bellows which actuates an alarm upon predetermined displacement.

Accordingly, it is an object of this invention to provide a device for sensing and warning of excessive ambulation force. It is a further object to provide such a device which depends upon displacement of fluid, rather than pressure increase therein, for signaling excessive ambulation force. It is a further object to employ a load cell which is resiliently deflectable and able to inherently carry the ambulation load, without the attachment of fluid displacement-sensing means thereto. It is still another object to provide a load cell and fluid displacement measuring means which can operate with a compressible fluid. It is still another object to provide a load cell for an ambulation force sensing and warning device which has first and second plates separated by resilient means, so that the plates come closer together with the application of load to the load cell, and this movement signals ambulation force increase.

Still other objects, features and attendant advantages of the present invention, together with various modifications, will become apparent to those skilled in the art from a reading of the following detailed description of the preferred embodiments, constructed in accordance therewith, taken in conjunction with the accompanying drawings wherein like numerals designate like parts in the several figures.

BRIEF DESCRIPTION OF THE DRAWINGS

FIG. 3 is an enlarged section taken generally along the line 3—3 of FIG. 2.

FIG. 4 is a section similar to FIG. 3 of a second embodiment of a load cell suitable for use in the device of this invention for sensing and warning of excessive ambulation force.

FIG. 5 is a further enlarged perspective view, with parts broken away, of another embodiment of edge construction suitable for the device of FIG. 4.

FIG. 6 is a side elevational view, with parts broken away, showing the preferred embodiment of the displacement detecting equipment and warning signal equipment useful as part of the device of this invention.

FIG. 7 is a view, similar in aspect to FIG. 6, of another embodiment of the equipment of FIG. 6.

DESCRIPTION OF THE PREFERRED EMBODIMENT

Figure 1:
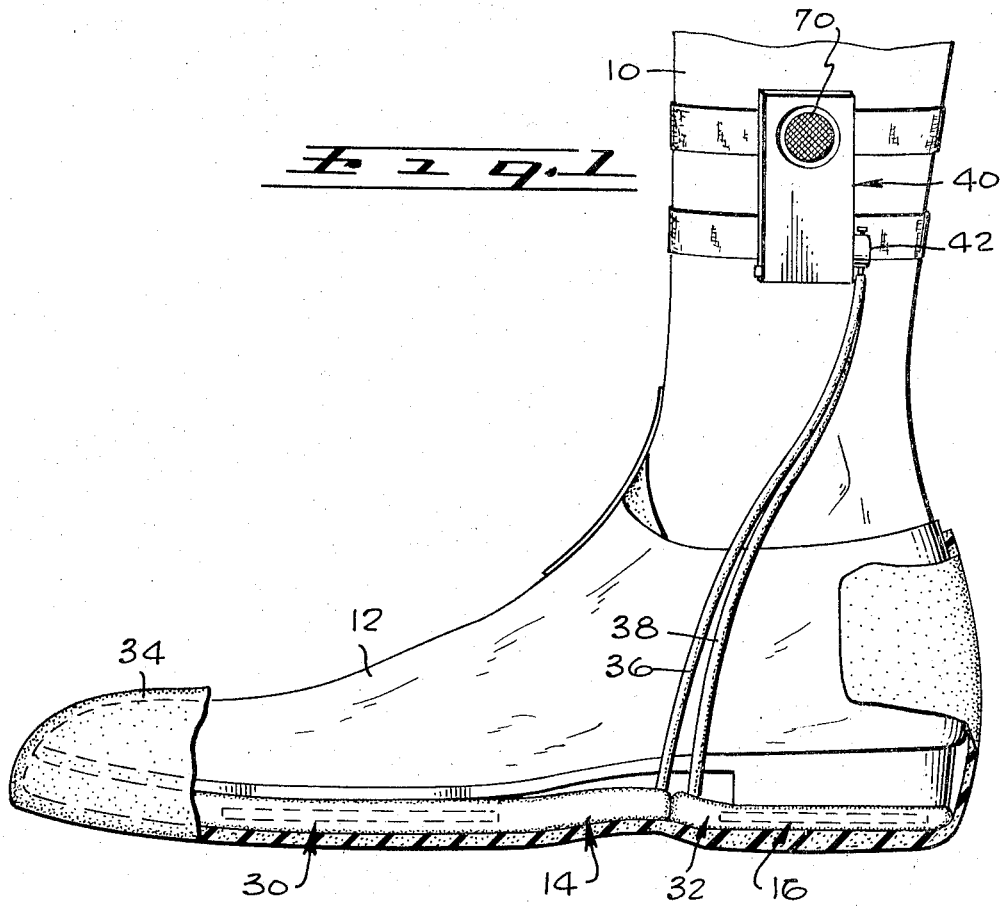
FIG. 1 is a side elevational view, with parts broken away and parts taken in section, showing the preferred embodiment of the device for sensing and warning of excessive ambulation force, in accordance with this invention.
Figure 2:
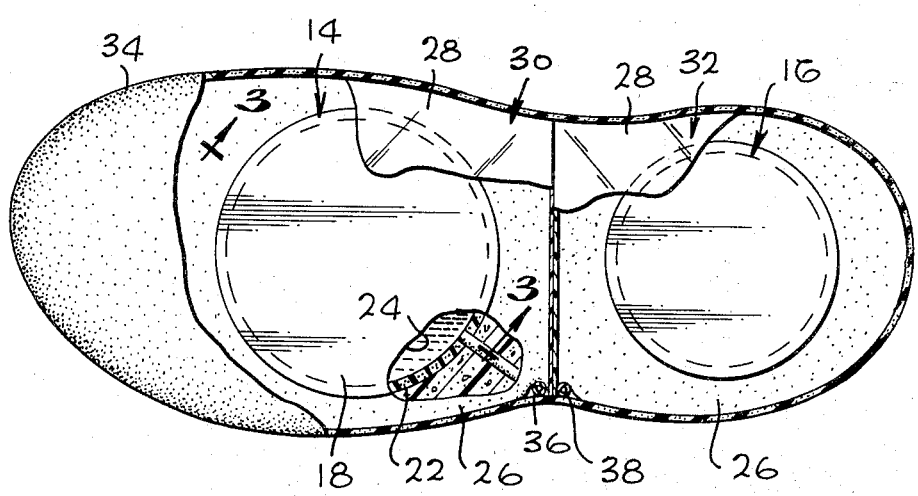
FIG. 2 is a top plan view of the preferred embodiment of the device of this invention as illustrated in FIG. 1, with parts broken away and parts taken in section.

FIGS. 1, 2 and 3 illustrate the preferred embodiment of the load-sensing and warning means for indicating excessive ambulation force. The lower extremity 10 is of the patient for whom warning of excess ambulation force is desired. The patient wears a conventional shoe 12, giving the convenience of exercising in accustomed garb. Load cells 14 and 16 are positioned respectively beneath the sole and heel of shoe 12 to be generally positioned under the ball and heel of the foot of the lower extremity 10.

As is indicated in FIGS. 2 and 3, the load cells 14 and 16 comprise substantially rigid upper and lower plates 18 and 20, respectively, maintained in spaced position by means of resilient, elastic spacer means 22. As illustrated in the preferred embodiment, the spacer means 22 is an elastomeric polymer composition material which extends around the periphery of the substantially circular upper and lower plates 18 and 20, and is sealed with respect thereto to define an enclosed space 24.

When the downward load is applied to the upper plate, the spacer means deflects and the distance between the plates will decrease. It is critical for the present invention that the spacer means meet two criteria. One is that the resiliency of the spacer means 22 be the same around the periphery of the plates. The second is that the shape and resilient characteristics of the spacer means be such that, for the range of load which will be applied to it, substantial proportionality exists between the applied force and the deformation of the spacer means. The proportionality and the uniformity of the deflection around the circumference produce the accuracy of load indication. When these two criteria are met, the space between the plates at their centers, and the total volume of the enclosed space 24, will decrease the same for a particular load, independently of where the load is applied to the upper plate, and such deflection and/or volume change versus load characteristic will be substantially linear over the pertinent load range. Furthermore, proportionality of volume change versus load change permits loads from two cells to be conveniently added, as is necessary when two cells are employed to measure the total load. To be theoretically correct, the plates must be of circular configuration for the decrease in center distance to be absolutely independent of the point of application of the force. However, for some other shapes of plates, sufficient accuracy for the purpose may be empirically determined.

In FIGS. 1 through 3, the load cells are peripherally surrounded by spacing material which produces an outline suitable for corresponding to the portion of the shoe with which they are associated. Foam material 26 surrounds load cell 14 to provide an outline configuration, as seen in FIG. 2, of the sole of a shoe. Both the foam spacer material 26 and the load cell 14 are encased in covering 28 to maintain the configuration of this unit. Thus, a sole unit 30 is configured to be placed under the sole of the shoe and ball of the foot, while a heel unit 32 is configured to be placed under the heel of the shoe and the heel of the foot. An ordinary rubber overshoe 34 is worn over the units and over the shoe to maintain the units with their load cells in place.

In the preferred embodiment, the load is measured by the volumetric displacement of the plates. Such displacement causes reduction in the enclosed volume 24. Tubes 36 and 38 are connected respectively to these enclosed volumes. Measurement of displacement of the fluid from the space thus can result in load indication. The measurement of load displacement is accomplished by the devices of FIG. 6 or 7. The structure of FIG. 6 is the preferred structure and is the one indicated in FIG. 1. Signal unit 40 comprises both displacement measuring means and output signaling means when a predetermined fluid displacement is reached. Tubes 36 and 38 are connected to manifold 42. The manifold 42 simply connects the two tubes 36 and 38 into a T-arrangement whereby they are both connected to the interior of bellows 44. A conventional valve 46 ports the manifold 42 to the atmosphere, is normally closed and may be used when filling the system with fluid and for bleeding air.

Bellows 44 has little strength of its own and does not cause an appreciable pressure increase in the fluid as the bellows is extended by fluid entry therein. The bellows merely has sufficient strength to maintain its shape and does not act as a device which increases displacement as a result of an increased input pressure. One side of the bellows is fixed to the wall of signal unit 40, while the other acts on switch arm 48. Switch arm 48 is pivoted at 50 and carries switch contact 52 at its lower end. Switch contact 52 is preferably insulated from arm 48 and is connected by wire 54 to a signaling device. Movable switch contact 52 is thus moved to the left, when fluid moving up tubes 36 and 38 causes bellows 44 to expand.

Adjustable switch contact 56 is mounted upon switch arm 58, which is also pivotally mounted on pivot 50. Switch arm 58 is moved to the left by tension spring 60 and its angular adjustment is controlled by screw 62, which engages in nut 64 mounted on switch arm 58. Thus, rotation of screw 62 swings arm 58 to control the position of adjustable contact 56. Adjustable contact 56 is mounted upon insulated mounting 66 and is connected by wire 68 to a signaling device. The signaling device can conveniently comprise a series-connected battery and audible alarm. The speaker of an audible alarm is indicated at 70 in FIG. 1. This construction is such that, when bellows 44 expands a predetermined amount, contacts 52 and 56 come into contact with each other, with resultant closure of the circuit to cause alarm actuation.

In order for the effects of load cells 14 and 16 to be properly additive, the same amount of fluid must be displaced from each cell when each receives the same load. Furthermore, the effect must be proportional for each cell so that, when the heel cell is receiving 90 percent of the load and the load cell under the ball of the foot is receiving 10 percent, the same total amount of fluid must be displaced as, when near the end of the step, the heel cell is receiving only 10 percent of the load and the ball cell is receiving 90 percent. For this reason, proportionality between load and displacement is required. When the load cells are of the same size, they can merely be of the same resiliency characteristics. However, when different sizes of load cells are employed, the result of equal flow displacement for the same loading can be accomplished by employing spacer means 22 of different spring rates. However, it is convenient and preferred that the load cells be of equal size, with spacer means 22 of the same spring rate and both should be of circular configuration, as described above.

FIG. 7 illustrates a signal unit 72 which is another means by which summation can be accomplished. In this case, presuming that the two load cells are not of equal characteristics, they are connected by their tubes 36 and 38 to two separate bellows 74 and 76. These bellows are fixed on one end to the frame of the signal unit and have their other ends freely movable, in accordance with the volume delivered to the bellows. The movable ends are connected together by means of bridge 78, which is pivoted at 80 to switch arm 82. Switch arm 82 is pivoted at 84 to the frame of the signal unit. Switch arm 82 carries movable switch contact 86 which faces adjustable switch contact 88. As is illustrated in FIG. 7, adjustable switch contact 88 is a device which is adjustably mounted with respect to the frame of the switch unit, in this case screw 90 threaded into the sidewall of the case. Switch contacts 86 and 88 are respectively connected by wires 92 and 94 to alarm structure 96. The alarm structure 96 can conveniently include an audible alarm connected in series with a battery, and both being connected in series to wires 92 and 94 and contacts 86 and 88. Closure of the contacts causes a closed circuit therethrough and through the audible alarm and battery so that the alarm sounds.

Again, the bellows 74 and 76 have little resiliency of their own, and only have sufficient strength to maintain their configuration. Increase in fluid therein does not cause an appreciable increase in pressure, but causes displacement of bridge 78. The bellows 74 and 76 are of such related cross section, and the pivot 80 is positioned along the length of bridge 78, such that addition of the load on the two cells is accomplished. This means that, if one of the load cells has a larger diameter to displace more fluid with a particular load than a smaller diameter cell, its corresponding bellows might be of larger diameter. Alternatively, or in combination therewith, the position of pivot 80 along the length of the bridge would be such that summation occurs. Such movement causes swinging of switch arm 82 in the upward direction of FIG. 7 to cause continuity between the contacts.

It has been previously discussed that, when a load cell is circular, and when the resilient spacer means therebetween is uniform around the circumference and responds proportionately in deflection to an applied load, that the spacing in the center of the load cell decreased the same amount, no matter where the localized load is applied on a cell. In the preferred embodiment of FIGS. 1 through 3, with their signal units at FIGS. 6 and 7, pressureless fluid load cells, which act on a purely displacement basis are taught. This is the preferred embodiment, because the fluid can be any convenient fluid, either an incompressible fluid such as water, or a compressible fluid such as air. Compressible fluids are useful, because the device operates on a purely displacement basis without causing any significant increase in pressure, so that compressibility does not present an inaccuracy problem. On the other hand, water is the preferred fluid, because it accurately displaces, in accordance with reduction in the enclosed volume 24. Furthermore, the remote measurement of displacement from the load cell permits adjustment away from the load cell so that adjustment can be conveniently accomplished, and even changed while the sensing device is being used.

FIG. 4 illustrates a load cell 100 which is comprised of upper and lower plates 102 and 104 which have a resilient, elastomeric spacer means 106 around the periphery thereof. Again, this spacer means is of the same response to load characteristics around the periphery, is linear in spring rate throughout the range in which measurement is made, and the plates are circular so that load applied to the plates causes the same deflection at the center of the plate, independently of where the load is applied. Upper plate 102 has a movable switch contact secured to the underside thereof. Lower plate 104 has an adjustable switch contact 110 mounted thereon, which is adjusted by means of nut 112 on threaded post 114. Access to the adjustment is gained through hole 116. Plates 102 and 104 are electrically separated from each other, because the spacer means 106 is electrically insulative. Therefor, when the space between the plates is decreased to a sufficient extent to cause the movable contact 108 to come into engagement with the adjustable contact 110, electric continuity therebetween is accomplished. This is connected to the signal unit through wires 118 and 120 to cause signal actuation. The load cell 100 is thus a device which signals an output whenever the load thereon reaches a certain limit. Preadjustment of the adjustable switch contact permits a determination of the load at which the signal will be produced.

FIG. 5 illustrates load cell 122 which has an upper plate 124 and lower plate 126. It has resilient spacer means 128 therebetween. As discussed with respect to the embodiment of FIG. 4, as long as the resilient spacer means is of substantially linear response through the operative range, and of uniform resiliency around the periphery of the plates, the desired result would be achieved. In the embodiment of FIG. 5, the resilient means 128 comprises a plurality of U-shaped springs spaced around the periphery of the plates and secured thereto. The signal means can be arranged in the same manner as in the embodiment of FIG. 4, so long as the resilient means is structured so that electrical separation between the plates 124 and 126 is accomplished. Thus, load cell 122 also meets the requirements for a load cell which is capable of sensing and warning of excessive ambulation force. The load cells of FIGS. 4 and 5 are particularly useful in cases where the application of the force is limited to one fairly small area, as it would be found in a walking heel fitted to a plaster cast.

The preferred embodiment of FIGS. 1, 2, 3 and 6 is worn in an overshoe. The physician defines the particular loading which a patient should apply to the extremity in question for exercise. The patient may adjust this load himself by applying the extremity to a weighing scale and increasing loading through the afflicted extremity onto the scale until the prescribed load is almost reached. Thereupon, adjustment of screw 62 is accomplished until the contact is closed to sound the warning device. Several tests of the device for sensing and warning of excessive ambulation force on the scale, with gradually increasing load until the prescribed load is reached, or the warning sounds, is practiced, with adjustment of the screw 62, as necessary, until the audible alarm sounds just before the load limit is reached. The signal unit 40 is preferably worn around the afflicted extremity so that it can be conveniently reached for adjustment. Thereupon, the patient can exercise with the knowledge that excess loading will be signaled to him to prevent overloading the afflicted extremity. Signal unit 72 is used in the same way. Load cells 100 and 122 of FIGS. 4 and 5 are employed in a similar manner, except that they must be adjusted to close their contacts before they are put under the shoe of the patient.

While particular embodiments of the present invention have been shown and described, it will be obvious to those skilled in the art that changes and modifications may be made without departing from the invention in its broader aspects, and, therefore, the aim in the appended claims is to cover all such changes and modifications as fall within the true spirit and scope of this invention.

What is claimed is:

1. A device for sensing and warning of excessive ambulation load force on the body when erect on the feet comprising:
   a load cell positionable to receive ambulation load, said load cell comprising upper and lower plates, spacer means between said upper and lower plates for maintaining said upper and lower plates in spaced condition, said spacer means comprising an elastomeric member extending around the periphery of said plates, said plates and said elastomeric member defining an enclosed fluid at ambient pressure which defines a volume in said load cell, said spacer means being resiliently deflectable by body forces so that said upper and lower plates are permitted to come closer together upon application of load downwardly on said upper plate to reduce said enclosed volume;
   a fluid tube connected to said enclosed volume;
   a bellows connected to said fluid tube and an electric switch contact connected to said bellows so that predetermined expansion of said bellows caused by fluid flow from said load cell to said bellows through said tube actuates said switch to cause signaling only when a predetermined load is reached and a resulting predetermined fluid flow has occurred, there being no signal below the predetermined ambulation force load and a warning signal above the predetermined ambulation force load.

2. The device of claim 1 wherein
   said bellows-mounted electric switch contact faces an adjustable electric contact, the position of said adjustable electric contact permitting selection of bellows expansion due to fluid inflow from said load cell before switch actuation so that the load on said load cell which causes signaling can be preselected.

3. The device of claim 1 wherein
   first and second load cells are positionable to receive ambulation force under the same foot, and both of said load cells are connected to the same bellows.

4. The device of claim 1 wherein
   there are first and second load cells positionable under the foot for which ambulation force is being sensed, said first and second load cells being respectively connected to first and second bellows, said first and second bellows being connected together for actuation of said switch.

5. The device of claim 1 wherein
   said load cell is surrounded with spacer material, and a covering covers said load cell and said spacer material, said covering, said load cell and said spacer material outlining a shoe area so that said load cell can be positioned with respect to a shoe.

6. The device of claim 5 wherein
   there are first and second load cells, each being peripherally surrounded by spacer material and each being covered so that the outlines thereof represent different positions of a shoe area.

7. The device of claim 6 wherein
   said first and second covered load cells are positioned within a rubber overshoe so that the load therein applied by a shoe can be sensed, and warning emitted for excessive ambulation force.

8. The device of claim 1 wherein
   said electric switch is connected to an audible signal for audibly signaling the reaching of the predetermined load on said upper plate.

9. The device of claim 1 wherein
   said resilient spacer means comprises an elastomeric member extending around the periphery of said plates.

10. The device of claim 1 wherein said plates are circular.

* * * * *